(12) United States Patent
Hesse

(10) Patent No.: US 7,737,371 B2
(45) Date of Patent: Jun. 15, 2010

(54) SAFETY DEVICES FOR INSULATIVE TOOLS

(76) Inventor: Karl Hesse, 820 Taylor Avenue, Winnipeg, Manitoba (CA) R3M 3T1

(*) Notice: Subject to any disclaimer, the term of this patent is extended or adjusted under 35 U.S.C. 154(b) by 1287 days.

(21) Appl. No.: 10/866,609

(22) Filed: Jun. 14, 2004

(65) Prior Publication Data
US 2004/0251700 A1 Dec. 16, 2004

(30) Foreign Application Priority Data
Jun. 16, 2003 (CA) .................................. 2432462

(51) Int. Cl.
*H02G 3/18* (2006.01)
*F16B 7/10* (2006.01)
(52) U.S. Cl. .................. 174/650; 174/135; 174/137 R; 174/5 R; 294/19.1; 361/816
(58) Field of Classification Search ............... 174/650, 174/659, 663, 664, 137 R, 142, 152 R, 153 G, 174/152 G, 135, 5 R; 294/19.1; 439/477; 248/56; 361/1, 816
See application file for complete search history.

(56) References Cited

U.S. PATENT DOCUMENTS

| | | | |
|---|---|---|---|
| 3,366,356 A * | 1/1968 | Fisher | 174/153 G |
| 3,372,960 A * | 3/1968 | Fisher | 174/153 G |
| 3,624,592 A | 11/1971 | Walter | |
| 3,866,965 A | 2/1975 | Homeier | |
| 3,868,136 A | 2/1975 | Schweitzer, Jr. | |
| 4,079,978 A | 3/1978 | McMullin | |
| 4,230,357 A | 10/1980 | Bosch et al. | |
| 4,326,316 A | 4/1982 | Dolenti | |
| 4,965,930 A | 10/1990 | Wnukowski | |
| 5,054,829 A * | 10/1991 | Olsen | 294/19.1 |
| 5,077,448 A | 12/1991 | Andrew | |
| 5,299,464 A | 4/1994 | Bennett | |
| 5,564,852 A | 10/1996 | Maxwell et al. | |
| 5,593,196 A | 1/1997 | Baum et al. | |
| 5,666,253 A * | 9/1997 | Whited et al. | 361/1 |
| 5,736,677 A * | 4/1998 | Sato et al. | 174/152 G |
| 6,332,368 B1 | 12/2001 | Cash et al. | |
| 7,428,131 B2 * | 9/2008 | Stillwagon et al. | 361/1 |

* cited by examiner

*Primary Examiner*—Angel R Estrada
(74) *Attorney, Agent, or Firm*—Ade & Company Inc.; Ryan W. Dupuis; Kyle R. Satterthwaite

(57) ABSTRACT

Safety devices and methods of use thereof are provided for improving electrical safety of insulative tools. In particular, the present invention provides a safety device for improving safety of an elongated insulative tool of a certain length with a substantially circular cross section having a cross sectional diameter and outer circumference, the device comprising a substantially circular disc with an inner opening for said elongated insulative tool to position therethrough, and said inner opening having a bore diameter that is substantially the same as or greater than the diameter of the elongated insulative tool. The present invention further provides novel methods of using through specific arrangement of the safety devices of the present invention on an elongated insulative tool.

28 Claims, 6 Drawing Sheets

SAFETY DEVICES FOR INSULATIVE TOOLS

FIELD OF THE INVENTION

The present invention relates to devices that improve the safety of certain insulative tools. More particularly, the present invention relates to devices that can be affixed to, or manufactured as integral parts of, elongated insulative tools conventionally used in high-voltage electrical conductor or equipment work.

BACKGROUND

In general, a number of insulative tools have been devised and are commercially available for use in performance of work on equipment and componentry that are energized at high electrical voltages. Their individual designs, for example in respect of their composition, structural designs and dimensions, are tailored to accommodate the safe handling of equipment and componentry energized to different levels. The basic principles governing such design requisites for the different types of insulative tools are generally known in the art, and overall guidelines and specifications are available for insulative tool manufacturers and users to ensure, in part, the minimal approach distance or separation between the energized equipment/componentry and the worker.

For example, one type of insulative tools commonly used for work on high-voltage electricity equipment or componentry is an elongated insulative pole with different adaptors and tools affixed onto a terminus thereof for performing different tasks and functions. A basic insulative pole is made of simple insulative materials such as plastic and is reinforced with fibreglass. Typical simple one-piece insulative poles that are available commercially are substantially cylindrical in configuration with lengths varying from approximately 6 feet to over 14 feet and cross sectional diameters (perpendicular to the longitudinal direction of the tool) varying from approximately 1 inch to 2 inches. More recent advances in insulative pole design include telescopic versions of insulative poles as described in U.S. Pat. No. 4,079,978 and U.S. Pat. No. 5,593,196.

With reference to above, the assortment of insulative poles is designed specifically for work on equipment or componentry energized to different levels. As a general rule of thumb, higher levels of energization require the use of insulative poles with greater lengths so to provide a safe distance between the worker and the energized equipment or componentry. For reference, a comprehensive listing of said minimum lengths of insulative poles relative to different levels of energization of the equipment or componentry (minimum approach distances) can be found in 29 CFR 1926.950-OSHA (American Society for Testing and Materials (ASTM) specifications), the Institute of Electrical and Electronic Engineers (IEEE) Standard 516-1995, and the Intenational Electrotechnical Commission (IEC) Standard 61472.

In additional to the inherent designs of insulative tools, it is also known that imperfections, damage, contamination and/or moisture on the surface of insulative tools can individually and/or collectively impact upon the insulative properties and reduce the safety of insulative tools. In essence, the presence of any, or a combination, of the aforementioned conditions reduces the inception voltage for dangerous electrical discharges, and correspondingly, stringent government regulated specifications and guidelines are in place to govern routine maintenance and inspection of high voltage insulative tools so to safeguard against arcing accidents.

Nevertheless, despite the most current designs and the industry's diligent use of conventional measures to maximize safety of insulative tools and safeguarding workers, occurrence of electrical discharges and arcing accidents from work on high voltage equipment and componentry remains a reality often resulting in severe injury to the workers involved, and at times, mortality.

A number of devices have been developed and taught in the prior art to enhance the safety of insulative tools.

One category of devices consists of mechanical attachments to a terminus of an insulative pole solely to improve functional dexterity in manipulation of energized equipment or componentry and reduce the likelihood of accidents due to mishandling of the energized equipment or componentry. A variety of connectors and tools of varying complexity has been taught in the prior art, for example, U.S. Pat. No. 3,624,592 teaches an inverted V-shaped hook that is adaptable to a terminus of an insulative pole; U.S. Pat. No. 3,866,965 teaches another attachment with radially projecting arms; U.S. Pat. No. 3,868,136 teaches an interior insulating rod coaxially and slidably within a hollow tubular insulating pole; U.S. Pat. No. 4,326,316 teaches a rotary brush device, again attachable to a terminus of an insulative pole, for cleaning aerial conductors; U.S. Pat. No. 4,965,930 teaches a set of pivoting jaws and a hook mountable onto a terminus of an insulative pole; U.S. Pat. No. 5,299,464 teaches a selective transformer penetration tool adaptable onto an insulative pole for remote sampling of oil from high voltage transformers; U.S. Pat. No. 5,564,852 teaches an adaptor connecting a tool to a terminus of an insulative tool which comprises of two members movable relative to each other to improve the adjustability and flexibility of tool angle with respect to the insulative pole; and U.S. Pat. No. 6,332,368 teaches a sampling tool mountable to a terminus of an insulative pole for sampling of aerial electrical equipment and componentry.

Another category of devices that has been developed to improve the safety of insulative poles consists in general of shields that can be affixed to an insulative pole so to act as a literal physical barrier between the worker and the energized equipment or componentry. For example, U.S. Pat. No. 5,077,448 teaches a transparent plastic protection shield that can be singly and releasably attached to an insulative pole in a manner that the shield is located close to the terminus of said insulative pole that is in contact with or near the energized equipment or componentry. In accordance to the inventor, positioning of the shield close to the equipment or componentry best protects a worker, who would be situated at the other terminus of the insulative pole, from any spent or disintegrated electrical parts or debris dislodged or ejected away from the energized equipment or componentry. U.S. Pat. No. 5,666,253 also describes a single protective shield attached to an insulative pole to provide physical barrier between the worker and the energized equipment in which the shield is made of a transparent and impact-resistant thermoplastic material with an opening formed in the shield plate for receiving an insulative pole therethrough. U.S. Pat. No. 4,230,357 also teaches a single physical shield circumferentially affixed to an insulative pole, in this instance a downwardly opening frustoconical flexible guard made of an insulative, nonconductive material, is fitted around the insulative pole solely to cover the worker's hand and to restrict movement of a worker's hand near the energized equipment or componentry.

As evident from the aforementioned references, safety devices of the prior art have all been developed to provide simple physical aids and simple physical barriers or shields to protect the worker from accidentally becoming in contact with the energized equipment or componentry or from debris ejected from the energized equipment or componentry towards the worker. None of the above provides any solution or means to protect the worker from the electrical fields that transcend the length of an insulative pole so to prevent dangerous electrical discharges that may be associated or result from said electric fields.

It is therefore the primary objective of the present invention to provide a novel category of safety devices to further improve upon the safety of insulative tools and to protect the worker from ill-effects associated with the electrical fields transcending along insulative tools or poles when in contact with or near energized equipment or componentry.

It should be readily apparent to a person skilled in the art that the safety devices of the present invention may be used singly or used in combination with any of the aforementioned safety devices of the prior art that are oriented towards physical protection of the worker.

SUMMARY OF THE INVENTION

An object of the present invention is to provide safety devices to improve the safety of insulative tools. In particular, the safety devices of the present invention are useful in reducing the probability of occurrence of dielectric breakdown events and spark over discharges and thereby reducing the risk of injury to the users of the insulative tools. It is believed that the safety devices of the present invention exerts its utility through their ability to modify electric fields associated with insulative tools and to extend leakage current paths, when such insulative tools are in contact with or near high-voltage electricity.

Another object of the present invention is to provide safety devices that can be fitted onto elongated insulative tools, such as insulative poles, so to improve the safety of such tools possibly by grading and tapering electric fields transcending along said elongated insulative tools when same are in contact with or near high-voltage electricity and thereby reducing the field strength at the point of contact by the user of the pole and reducing the probability of occurrence of dielectric breakdown events and spark over discharges and thereby reducing the risk of injury to the user of said pole. Said safety devices may be an inherent aspect of the design of the elongated insulative tools and incorporated onto said tools during manufacture, or said safety devices may be affixed onto elongated insulative tools as aftermarket additions.

Yet another object of the present invention is to provide methods and applications for the use of the safety devices of the present invention to improve the safety of insulative tools, including elongated insulative tools such as insulative poles.

According to a first aspect of the present invention, there is provided a safety device for improving safety of an elongated insulative tool of a certain length with a substantially circular cross section defining a cross sectional diameter and an outer circumference, the device comprising a body defining an inner opening for receiving the insulative tool therethrough, the body spanning generally radially outwardly from the inner opening to lie transversely to a longitudinal direction of the insulative tool received therethrough.

In one embodiment, the safety device has an outer circumference of between approximately two-fold to approximately ten-fold of the outer circumference of the elongated insulative tool, an inner opening bore diameter that is substantially the same as the cross sectional diameter of the elongated insulative tool, and a thickness of between approximately ten percent to approximately one hundred percent of the diameter of the elongated insulative tool.

The substantially circular disc configuration of the safety device may be a substantially cylindrical, bi-convex, semi-convex, biconcave, semi-concave, spheroidal or semi-spheroidal disc, which may have a smooth surface or may optionally include relatively smooth protrusions such as substantially circular rim(s) disposed substantially concentrically on one or both substantially circular faces of the disc.

Preferably, the safety device is a substantially cylindrical disc having an outer circumference of between approximately two-fold to approximately five-fold of the outer circumference of the elongated insulative tool, and a thickness of between approximately ten percent to approximately one hundred percent of the diameter of the elongated insulative tool.

The safety device is preferably made of a semiconductive material, but may alternatively be made of a conductive or nonconductive material.

In a second aspect of the present invention, there is provided a safety device that is a substantially circular disc with an inner opening for an elongated insulative tool to position therethrough, and said inner opening having a bore diameter that is substantially greater than the diameter of the elongated insulative tool.

In one embodiment, the safety device has an outer circumference of between approximately two-fold to approximately ten-fold of the outer circumference of the elongated insulative tool, an inner opening bore diameter that can be as large as approximately 4.5-times the cross sectional diameter of the elongated insulative tool, and a thickness of between approximately ten percent to approximately one hundred percent of the diameter of the elongated insulative tool.

The substantially circular disc configuration of the safety device may again be a substantially cylindrical, bi-convex, semi-convex, biconcave, semi-concave, spheroidal or semi-spheroidal disc, which may be made of a conductive or semi-conductive material.

Preferably, the safety device in this aspect is a substantially cylindrical disc made of a conductive material having an outer circumference of between approximately two-fold to approximately five-fold of the outer circumference of the elongated insulative tool, an inner opening bore diameter of between approximately 150 percent and approximately 450 percent of the cross sectional diameter of the elongated insulative tool, and a thickness of between approximately ten percent to approximately one hundred percent of the diameter of the elongated insulative tool.

According to another aspect of the present invention, there is provided a method of improving the safety of an elongated insulative tool, the method comprising:

providing at least one safety device comprising a body defining an inner opening, the body spanning generally radially outwardly from the inner opening; and extending the insulative tool through the inner opening of said at least one safety device such that the body thereof lies transversely to a longitudinal direction of the insulative tool received therethrough.

It is surprisingly discovered by the present inventor that the novel positioning of the at least one safety device(s) along an elongated insulative tool can decrease the leakage current transcending along the elongated insulative tool as well as increase the voltage threshold for the occurrence of dangerous electrical discharges when one terminus of the elongated insulative tool is in contact with or near high voltage electricity.

In one embodiment, at least one safety device(s) preferably has an outer circumference of between approximately two-fold to approximately five-fold of the outer circumference of the elongated insulative tool, an inner opening bore diameter that is substantially the same as the cross sectional diameter of the elongated insulative tool, and a thickness of between approximately ten percent to approximately one hundred percent of the diameter of the elongated insulative tool.

Preferably, the at least one safety device(s) of the present invention is placed around the elongated insulative tool in a manner that the at least one safety device(s) and the elongated insulative tool have their geometric centres substantially concentrically aligned, and that the diameter of the at least one safety device(s) is substantially perpendicular to the longitudinal axis or direction of the elongated insulative tool. In striking contrast with the prior art, the at least one safety device(s) of the present invention is preferably placed closer or proximate to the terminus of an elongated insulative tool that is contacted by the worker, rather than the terminus of said elongated insulative tool that would come in contact with or near the energized equipment or componentry.

In another embodiment, two or more safety devices are placed around an elongated insulative tool, as contrasting to the use of single physical shields taught in the prior art, said safety devices are preferably placed in series with respect to each other around two or more segments of the elongated insulative tool.

The two or more safety devices that are placed in series around the elongated insulative tool may individually and independently have same, similar or different outer circumferences, thicknesses, and bore diameters. Each of the safety devices has an outer circumference and thickness that are sufficient to influence any electric field transcending along the elongated insulative tool, but it should not be oversized so as to detriment the mobility or maneuverability of the elongated insulative tool or the worker using same. Preferably, each safety device has an outer circumference of between approximately two-fold to approximately five-fold of the outer circumference of the elongated insulative tool and a thickness of between approximately ten percent to approximately one hundred percent of the cross sectional diameter of the elongated insulative tool. In the event that more than two safety devices are involved, the safety devices may be placed in series at even or uneven separation intervals at an inter-device distance of preferably between approximately twenty percent to approximately two hundred percent of the diameter of the elongated insulative tool.

In a preferred embodiment, the two or more safety devices that are placed in series around the elongated insulative tool have inner openings with different bore diameters wherein at least one of the safety devices has an inner opening that has a bore diameter that is substantially the same as the cross sectional diameter of the elongated insulative tool and at least one of the safety devices has an inner opening that has a bore diameter that is larger than the cross sectional diameter of the elongated insulative tool. The at least one of safety devices having an inner opening with a bore diameter that is substantially the same as the cross sectional diameter of the elongated insulative tool would preferably be made of a semiconductive material, whilst the at least one of the safety devices having an inner opening with a bore diameter that is larger than the cross sectional diameter of the elongated insulative tool would preferably have a bore diameter of between approximately 150 percent and approximately 450 percent of the cross sectional diameter of the elongated insulative tool and be made of a conductive material.

Yet further, when two or more safety devices are placed in series around the elongated insulative tool, it is preferred that the safety device furthest away from the terminus of the elongated insulative tool that is contacted by the worker preferably has an inner opening with a larger or largest bore diameter as compared to that or those of the safety device(s) closer to the worker. An optional example arrangement is that when two or more safety devices are placed in series around the elongated insulative tool, said series of two or more safety devices would have inner openings with sequentially decreasing bore diameters towards the terminus of the elongated insulated tool contacting a worker.

Other objects, features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

For a more detailed disclosure of the invention and for further objects and advantages thereof, reference is to be had to the following description taken in conjunction with the accompanying drawings, in which.

DETAILED DESCRIPTION

Referring to the accompanying figures there is illustrated safety devices to improve the safety of insulative tools and methods and applications for the use of said safety devices to improve the safety of insulative tools.

Figure 1A:
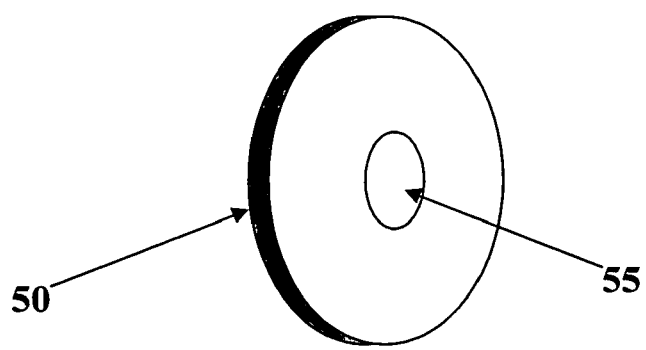
FIG. 1a is a perspective view of a substantially cylindrical safety device of the present invention.
Figure 1B:
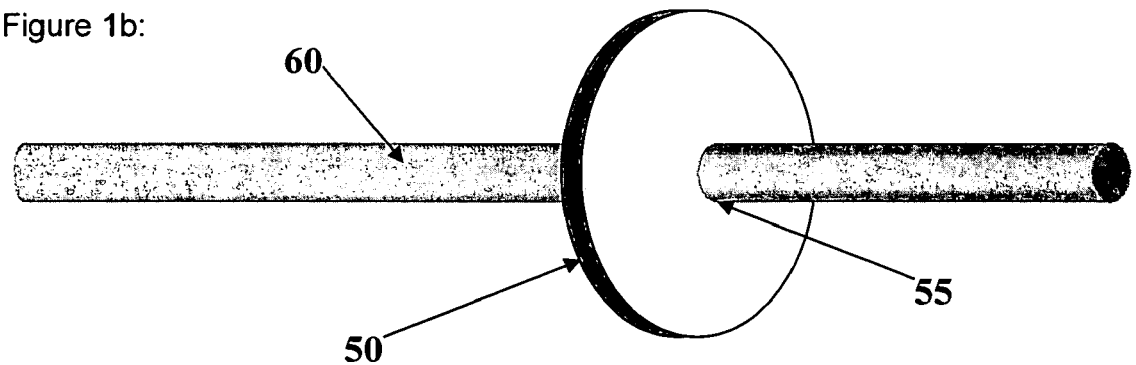
FIG. 1b is a perspective view of a substantially cylindrical safety device of the present invention and its relative positioning around an elongated insulative tool.

One first aspect of the present invention relates to safety devices for improving safety of an elongated insulative tool, such as an insulative pole. Referring to FIG. 1a herein, a preferred embodiment of the present invention is illustrated as a safety device 50 comprising a substantially circular disc with a substantially circular inner opening 55 with a bore diameter that is substantially the same as the diameter of the elongated insulative tool so that an elongated insulative tool can be positioned therethrough. For the purpose of illustration, the substantially coaxial positioning of an insulative pole 60 with respect to the safety device of the present invention 50 with inner opening 55 is set forth in FIG. 1b.

Figure 2A:
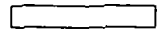
FIG. 2a is a longitudinal side section view of a substantially cylindrical safety device of the present invention.
Figure 2B:
FIG. 2b is a longitudinal side section view of a substantially biconcave safety device of the present invention.
Figure 2C:
FIG. 2c a longitudinal side section view of a substantially bi-convex safety device of the present invention.
Figure 2D:
FIG. 2d is a longitudinal side section view of a substantially semi-concave safety device of the present invention.
Figure 2E:
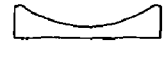
FIG. 2e is a longitudinal side section view of a substantially semi-convex safety device of the present invention.
Figure 2F:
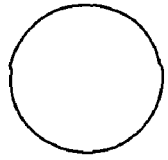
FIG. 2f is a longitudinal side section view of a substantially spheroidal safety device of the present invention.
Figure 2G:
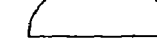
FIG. 2g is a longitudinal side section view of a substantially semi-spheroidal safety device of the present invention.
Figure 2H:
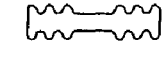
FIG. 2h is a longitudinal side section view of a variation of the safety device of the present invention comprising a substantially circular disc with substantially circular rim(s) disposed substantially concentrically on both faces of the safety device.

For the purpose of the present invention, a disc is understood to comprise objects of generally discoid configuration including without limitation those that are substantially cylindrical, bi-convex, semi-convex, biconcave, semi-concave, spheroidal or semi-spheroidal in configuration, each having longitudinal side section profiles as respectively illustrated as FIGS. 2a, 2b, 2c, 2d, 2e, 2f and 2g. It should be readily apparent to persons skilled in the art that minor feature variations of these basic designs would not detract function or utility from such variants as safety devices of the present invention. For example, a safety device of the present invention may optionally include substantially circular rim(s) disposed substantially concentrically on one or both substantially circular faces of the disc. The longitudinal side section profile of such a minor variant is illustrated as FIG. 2h.

In one embodiment, the safety device preferably has an outer circumference of between approximately two-fold to approximately five-fold of the outer circumference of the elongated insulative tool, the bore diameter of its an inner opening is substantially the same as the cross sectional diameter of the elongated insulative tool, and a thickness of between approximately ten percent to approximately one hundred percent of the diameter of the elongated insulative tool. The relatively small outer circumference of the safety device is distinctly distinguishable to the physical shields as taught in the prior art and is preferred as a smaller device would be less likely to obstruct the vision of the worker or to restrict the mobility or maneuverability of the elongated insulative tool. The preferred range in thickness of the safety device is also expected to confer sufficient strength and structural integrity to the safety device whilst retaining a practically acceptable weight range and maneuverability for the user of the tool.

The safety devices of the present invention may be affixed to an elongated insulative tool by simple frictional or clamping means when removability is required, or by conventional adhesive or attachment means when permanent positioning is desired. It should therefore be readily apparent to a person skilled in the art that the safety devices may be an inherent aspect of the design of any elongated insulative tools and incorporated onto same during manufacture, or the safety devices may be affixed onto elongated insulative tools as aftermarket additions.

Preferably, the safety device in this embodiment is made of a semi-conductive material, although a conductive material or a non-conductive material may be substituted without totally sacrificing function. Semi-conductive materials are preferred for their ability to taper electric fields as well as for their relatively lighter weight so that maneuverability of the elongated tool would not be significantly hampered. Semi-conductive materials for the purpose of the present invention are in general materials that have electrical resistivity and conductivity that are between those associated with conductive materials and non-conductive materials. For the purpose herein, the term semi-conductive materials would also include those materials that have varying resistivity and conductivity that spans between those of conductive materials and non-conductive materials. For example, materials commonly used in making varistors, such as metal oxide varistors, have resistivity and conductivity of, and behave as, a semiconductive material at certain voltages.

The more commonly referred to Semi-conductive materials are in general crystalline in structure and can be categorized into elemental semi-conductive materials and compound semi-conductive materials. Elemental semi-conductive materials consist of crystals composed of only a single atomic element from group 14 (IV) of the Chemistry's periodic table, germanium (Ge), silicon (Si), carbon (C), and tin (Sn). Bonding between atoms in elemental semi-conductive materials is covalent bonding and the atoms can generally be arranged in a Lonsdaleite hexagonal diamond crystal structure. Compound semi-conductive materials have a crystal lattice constructed from atomic elements in different groups of the periodic chart. For example, a Group 13 (III)-15 (V) semi-conductive material is based on a first atomic element from Group III and another atomic element from Group 15 (V). Each Group 13 (III) atom is bound to four Group 15 (V) atoms, and each Group 15 (V) atom is bound to four Group 13 (III) atoms, giving a generally tetrahedral basic arrangement. Bonding between atoms in compound semiconductors is primarily covalent bonding, but the shift of valence charge from the Group V atoms to the Group 13 (III) atoms also confers a component of ionic bonding to the crystal. Example Group 13 (III)-15 (V) compound semi-conductive materials are GaP, GaAs, GaSb, InP, InAs, and InSb. Similarly, a Group 2 (II)-16 (VI) semi-conductive material is based on a first atomic element from Group 2 (II) and another atomic element from Group 16 (VI), interatomically arranged to generally form a wurtzite lattice structure. The increased charge from Group 16 (VI) to Group 2 (II) atoms, however, tends to cause the bonding to be more ionic than in the case of Group 13 (III)-15 (V) semi-conductive materials. Example Group II-VI semiconductors include ZnS, ZnSe, ZnTe, CdS, CdSe, and CdTe. It should be readily apparent to a skilled artisan that the conductivity/resistivity of semi-conductive materials are routinely controlled by such "doping" processes. Furthermore, semi-conductive materials for the purpose herein would also encompass certain derivatives of conductive materials or nonconductive materials for which the derivatization process in essence decreases or increases the starting materials' conductivity respectively. For example, zinc oxide is a semi-conductive oxidation derivative product of the conductive metal zinc.

In a second aspect of the present invention, there is provided a safety device that is a substantially circular disc with an inner opening for an elongated insulative tool to position therethrough, and said inner opening having a bore diameter that is substantially greater than the diameter of the elongated insulative tool.

Figure 3:
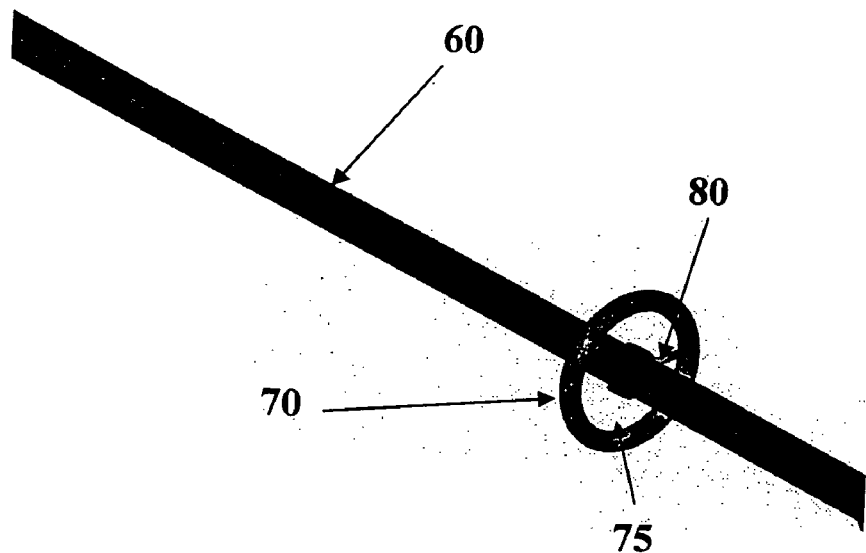
FIG. 3 is a perspective view of a safety device of the present invention comprising a substantially circular disc having a substantially circular inner opening with a bore diameter that is substantially greater than the diameter of the elongated insulative tool.

Referring to FIG. 3 herein, a preferred embodiment of the present invention is illustrated as a safety device 70 comprising a substantially circular disc with a substantially circular inner opening 75 with a bore diameter that is substantially greater than the diameter of the elongated insulative tool. For the purpose of illustration, the substantially coaxial positioning of an insulative pole 60 with respect to the safety device 70 with inner opening 75 is also illustrated herein.

In one embodiment, the safety device preferably has an outer circumference of between approximately two-fold to approximately five-fold of the outer circumference of the elongated insulative tool, an inner opening bore diameter ranging from approximately 150 percent to 450 percent of the cross sectional diameter of the elongated insulative tool, and a thickness of between approximately ten percent to approximately one hundred percent of the diameter of the elongated insulative tool.

The relatively small outer circumference of the safety device is again distinctly distinguishable to the physical shields as taught in the prior art and is preferred as a smaller device would be less likely to obstruct the vision of the worker or to restrict the mobility or maneuverability of the elongated insulative tool. The preferred range in thickness of the safety device is also expected to confer sufficient strength and structural integrity to the safety device whilst retaining a practically acceptable weight range and maneuverability for the user of the tool.

The substantially circular disc configuration of the safety device may again be a substantially cylindrical, bi-convex, semi-convex, biconcave, semi-concave, spheroidal or semi-spheroidal disc, which may be made of a conductive material or a semi-conductive material, preferably made of a conductive material. Semi-conductive materials are preferred for their ability to grade and linearize electric fields as well as for their relatively lighter weight so that maneuverability of the elongated tool would not be significantly hampered. In this circumstance as the inner bore diameter of the safety device may be substantially larger than the cross sectional diameter of the elongated insulative tool, the weight of the material would be less critical and heavier conductive materials, that are also preferred for their ability to grade and linearize electric fields, may be substituted.

As compared to the semi-conductive materials aforementioned, conductive materials such as metals and metal alloys are inherently good electrical conductors and are suitable materials for the present embodiment of safety devices. Examples of suitable metals are steel, aluminum, magnesium, copper, zinc, titanium, or alloys based on any of the foregoing.

By ways of comparison for the purpose herein, nonconductive or insulative materials, as its nomenclature implies, comprise materials that do not conduct electricity or have very low conductivity. Typically encountered nonconductive materials in the electrical industry are plastics, ceramics, porcelain, fiberglass, Teflon, and a variety of high molecular weight polymeric compounds such as silicone rubber (PDMSO), ethylene propylene rubber (EPR) and ethylene propylene diene monomer (EPDM).

With reference to FIG. 3 herein, such safety devices with relatively larger inner opening bore diameters may be affixed to an elongated insulative tool by conventional connecting means such as one or more radial spoke(s) 80 permanently or releasably connecting the side of the inner opening to the outer surface of the elongated insulative tool. As should be apparent to a skilled artisan, the connection of the one or more radial spoke(s) to the elongated insulative tool may be effected through conventional attaching means such as the use of clamping and/or bolting mechanisms.

According to another aspect of the present invention, there is provided a method of improving the safety of an elongated insulative tool of a certain length with a substantially circular cross section having a cross sectional diameter and outer circumference, said method comprising the substantially coaxial placement of at least one safety device around at least one segment of said elongated insulative tool, said safety device comprising a substantially circular disc with an inner opening for said elongated insulative tool to be positioned therethrough. It is surprisingly discovered by the present inventor that such novel positioning of the at least one safety device(s) along an elongated insulative tool can decrease the leakage current transcending along the elongated insulative tool as well as increase the threshold voltages at which dangerous electrical discharges occur when one terminus of the elongated insulative tool is in contact with or near high voltage electricity.

The primary objective in improving the safety of the worker using an elongated insulative tool is to effect a smooth graduated decline in the electric field transcending along the length of the elongated insulative tool so that the electric field strength at the terminus in contact with the user of the tool would be at a minimum. A safety device with an inner opening bore diameter substantially the same as the cross sectional diameter of the elongated insulative tool is more effective in grading or linearizing the electric field transcending along the elongated insulative tool, while a safety device with an inner opening bore diameter larger than the cross sectional diameter of the elongated insulative tool is expected to be more effective in tapering or terminating the electric field transcending along the elongated insulative tool.

The at least one safety device again may be a substantially cylindrical, bi-convex, semi-convex, biconcave, semi-concave, spheroidal or semi-spheroidal disc, and preferably has an outer circumference of between approximately two-fold to approximately five-fold of the outer circumference of the elongated insulative tool, an inner opening being substantially circular having a bore diameter that is between substantially the same as the cross sectional diameter of the elongated insulative tool or up to approximately 450 percent of the cross sectional diameter of the elongated insulative tool, and a thickness of between approximately ten percent to approximately one hundred percent of the diameter of the elongated insulative tool. The at least one safety device may be made of a conductive material, a semi-conductive material or a nonconductive material as more fully described above, but said at least one safety device preferably is made of a conductive material or a semi-conductive material.

In one embodiment, a single safety device of the present invention as described in detail above is placed around the elongated insulative tool in a manner that the safety device and the elongated insulative tool have their geometric centers substantially aligned. Preferably, the diameter of the safety device is substantially perpendicular to the longitudinal axis or direction of the elongated insulative tool.

In a second embodiment, two or more safety devices of the present invention that are substantially similar in outer circumference to each other are placed around an elongated insulative tool so to take advantage of a combination of the effects that are conferred by each individual safety device. This is in distinct contrast to the use of a single physical shield per elongated insulative tool as previously taught in the prior art.

Said two or more safety devices may individually and independently have a configuration resembling substantially cylindrical, bi-convex, semi-convex, biconcave, semi-concave, spheroidal or semi-spheroidal discs, and may independently have similar or different outer circumferences, thicknesses, and bore diameters. Notwithstanding the above, the two or more safety devices preferably would each have a substantially cylindrical configuration, and a thickness of between approximately ten percent to approximately one hundred percent of the diameter of the elongated insulative tool.

In striking contrast to that taught in the prior art, the two or more safety devices are serially placed preferably closer to the terminus of an elongated insulative tool that is contacted by the worker, rather than the terminus of said elongated insulative tool that would come in contact with or near the energized equipment or componentry.

The two or more safety devices preferably have inner openings with different bore diameters, and in one example, at least one of the two or more safety devices has an inner opening with a bore diameter substantially the same as the cross sectional diameter of the elongated insulative tool and at least one of the two or more safety devices has an inner opening with a bore diameter of between approximately 150 percent and approximately 450 percent of the cross sectional diameter of the elongated insulative tool. As aforementioned, safety devices with inner openings of different bore diameters exerts different influences on electric fields and a combinational use of two or more safety devices with inner openings of different bore diameters is preferred so as to achieve a combinatorial effect of the two types of safety devices in smoothing or graduating as well as in tapering or terminating the electric field that transcends along the length of the elongated insulative tool. The at least one safety devices having an inner opening with a bore diameter substantially the same as the cross sectional diameter of the elongated insulative tool is made of a semiconductive material, whilst the safety devices having an inner opening with a bore diameter larger than the cross sectional diameter of the elongated insulative tool is made of a conductive material.

Figure 4A:
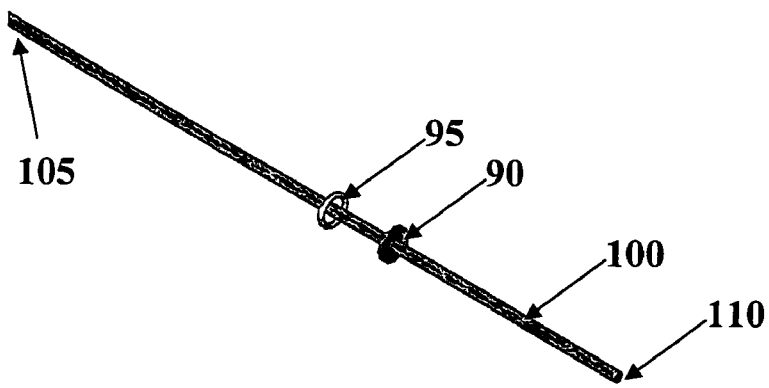
FIGS. 4a, 4b and 4c are perspective views to schematically exemplify the positioning of two or more safety devices with different inner opening bore diameters placed around an elongated insulative tool in relation to the termini of the elongated insulative tool that are respectively proximate to the worker and to the energized equipment or componentry.

By way of illustration, FIG. 4a herein provides a schematic representation to exemplify one of the preferred methods of the present invention. In this example, two safety devices 90 and 95 are placed in series around an elongated insulative tool 100 which in turn has a terminus 105 that would be in contact with or near the energized equipment or componentry and another terminus 110 that would be in contact with a worker. Of note is that the bore diameter of the inner opening of safety device 90, which is the device relatively closer to the worker handling the elongated insulative tool, is substantially the same as the cross sectional diameter of the elongated insulative tool and is relatively smaller than the bore diameter of the inner opening of safety device 95 that is placed relatively closer to terminus 105 that would be in contact with or near the energized equipment or componentry.

Figure 4B:
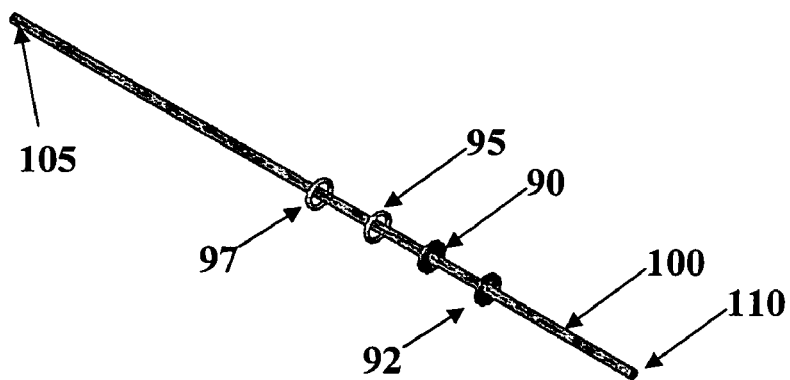
Figure 4C:
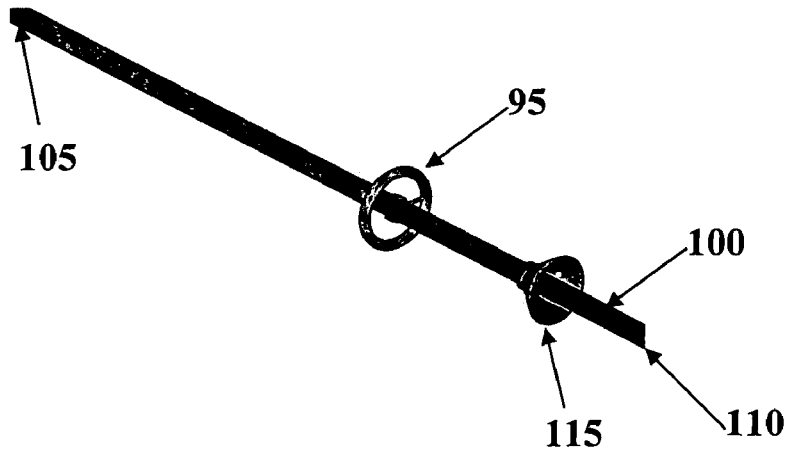

It should be readily apparent to a skilled person in the art that this example serves simply to describe the preferred order of arrangement of safety devices with different inner opening bore diameters and that additional safety devices may be used. For instance, referring to FIG. 4b, an additional one or more safety device(s) 92 that are same or similar to safety device 90 may be serially added between safety device 90 and terminus 110, and similarly, an additional one or more safety device(s) 97 that are same or similar to safety device 95 may be serially added between safety device 95 and terminus 105. As aforementioned, the configuration of the safety devices may be substantially cylindrical as illustrated in FIG. 4a, or any one or more of said safety device(s) may be of an alternative configuration, for example as illustrated in FIG. 4c, the substantially cylindrical safety device 90 from FIG. 4a is substituted by a substantially semi-concave or frustoconical disc 115. Yet further, an optional arrangement for a plurality of safety devices of the present invention could entail the placement of said plurality of safety devices in series around an elongated insulative tool and that said series of safety devices would have inner openings with sequentially and gradually decreasing bore diameters towards terminus 110.

The two or more safety devices of this embodiment placed in series with respect to each other around two or more segments of the elongated insulative tool may be independently placed at even or uneven separation intervals, each said inter-device separation interval preferably ranges between approximately ten percent to approximately two hundred percent of the diameter of the elongated insulative tool.

As noted above in greater detail with regard to the various embodiments, the safety devices each generally comprise a body which is arranged to be supported on the elongate insulated shaft of handling tools for high voltage applications. The shaft in this instance typically extends in a longitudinal direction from a gripping end supporting a handle for being held by an operator to a working end supporting a tool for manipulating high voltage equipment thereon. The body, in each instance of the safety device, includes an inner opening receiving the shaft therethrough. Mounts are provided on the body for mounting on the shaft intermediate the ends thereof by any suitable conventional means. The body, despite being of various disc or annular shapes, generally extends radially outwardly in each instance from the inner opening and the shaft extending therethrough so as to define a pair of opposed surfaces lying generally perpendicular to the longitudinal direction of the shaft. When plural devices are provided, the devices are supported on the shaft at spaced positions from one another in the longitudinal direction of the shaft.

Figure 5:
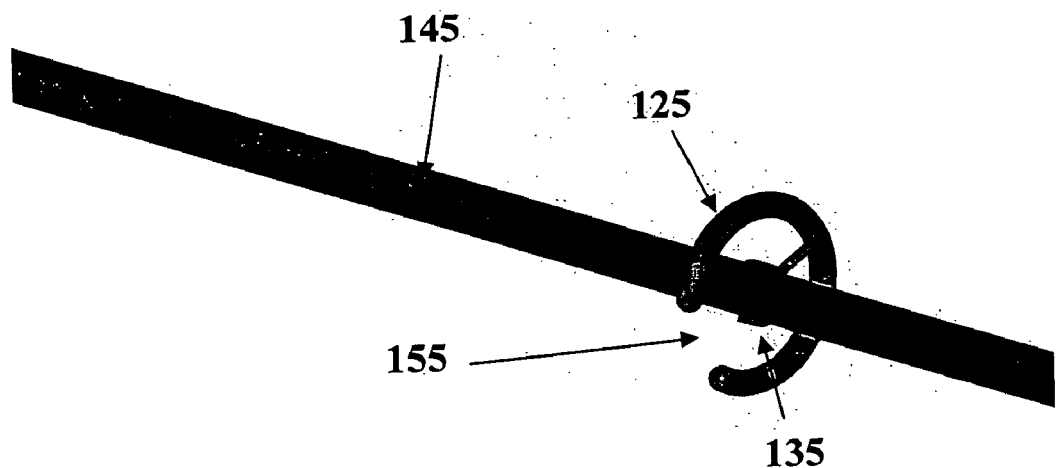
FIG. 5 is a perspective view of a safety device of the present invention comprising a substantially circular disc having a substantially circular inner opening with a bore diameter that is substantially greater than the diameter of the elongated insulative tool and a radial channel opening.

It should be appreciated to those skilled in the art that when the safety devices of the present invention are removably affixed to an elongated insulative tool by simple frictional or clamping means, the number of safety devices affixed to the elongated insulative tool may be varied easily to suit individual applications and that the separation intervals between any set of two safety devices may also be easily adjusted. To facilitate the ease of affixation or removal of a safety device onto and from the elongated insulative tool, a substantially discoid safety device may have a radial channel opening that is of sufficient width to allow the diameter of the elongated insulative tool to pass through into the substantially central inner opening of the substantially discoid safety device. Such a setup is schematically exemplified in FIG. 5 wherein safety device 125 comprising a substantially circular disc with a substantially circular inner opening 135 with a bore diameter that is substantially greater than the diameter of the elongated insulative tool 145 and with a radial channel opening 155 that is of sufficient width to allow the diameter of the elongated insulative tool to pass through into the substantially central inner opening of the substantially discoid safety device.

In determining the effectiveness of the safety devices of the present invention, conventional high voltage tests are described below in which 320 kV (line-to-neutral) is applied to one terminus of the elongated insulative tool while the other terminus of said tool is grounded. Testing end-points include measurement of leakage current transcending the length of said elongated insulative tool using conventional ammeter means. Additionally, the threshold voltage for occurrence of dangerous electrical discharges (flashovers) may be determined by simple visual inspection as the high voltage applied across the length of the elongated insulative tool is gradually increased. The application of safety-device (s) of the present invention to an elongated insulative tool reduces leakage current transcending the elongated insulative tool and increases the threshold voltage for occurrence of dangerous electrical discharges (flashovers).

EXAMPLE 1

Clean Fog Testing of Insulative Pole with and without Safety Devices of the Present Invention A program of tests was carried out to determine the options for avoiding flashover of fiberglass reinforced poles (FRP) hot sticks (insulative tools). All tests were made on 3.0 m lengths of 32 mm diameter insulative tool that had universal fittings at each end. Each insulative tool had passed routine testing of 105 kVdc per 30 cm when wetted with distilled water with no more than 5 μA leakage current. A certain number of the insulative tools were fitted with fifteen safety devices of the present invention equally spaced over the lower 2 m of the insulative tool. Each of the safety devices has a substantially circular cross section defining a cross sectional diameter and an outer circumference, and a body defining an inner opening for receiving the insulative tool therethrough, the body spanning generally radially outwardly from the inner opening to lie transversely to a longitudinal direction of the insulative tool received therethrough. The outer diameter of each of the safety devices used, when installed onto the insulative tool, was approximately 82 mm, while the outer circumference of same was approximately 258 mm. The thickness of each of the safety devices used, when installed onto the insulative tool, was approximately 4 mm. The safety devices used were made of polyolefin containing zinc oxide and a UV stabilizer and were sourced from Raychem (Tyco International Ltd).

For the clean fog tests a pollution slurry was spray applied to the insulative tool and safety device surfaces. This was mixed in the proportions of 1.6 L water, 6.4 L alcohol and 320 g kaolin. Sodium chloride was added to the slurry to obtain the desired equivalent salt deposit density (ESDD). The insulative tools were tested in the vertical position with the upper universal fitting of each insulative tool in contact with a lower subconductor of a 4-conductor bundle. The lower universal fitting of each insulative tool was connected to ground by means of a coaxial cable to a shunt at the floor of the test chamber. Immediately adjacent to the lower universal fitting the coaxial cable was enclosed within a 300 mm diameter vertical metal tube which was at ground potential.

The clean fog tests began with insulative tools without the safety devices. A constant voltage of 320 kVrms was applied which represents the line-to-ground voltage of a 550 kVac line. Within several minutes of the voltage being applied, clean fog was introduced at a constant rate of 0.05 kg/m$^3$ of the chamber volume per hour of the test. Three repeated clean fog tests resulted in a withstand at 320 kV as are summarized in Table I:

TABLE I

Clean Fog Withstands - Insulative Tools without Safety Devices

| Test | Minutes to Flashover | ESDD μg/cm$^2$ | | |
|---|---|---|---|---|
| | | Upper | Middle | Lower |
| B2-4 | 60 | 1.1 | 1.9 | 2.2 |
| B2-8 | 75 | 1.5 | 2.3 | 2.5 |
| B2-10 | 73 | 1.4 | 1.8 | 2.0 |

The recorded time is from the initiation of >2 mA leakage current, which was declining by the end of the test.

For the clean fog tests on insulative tools each with 15 safety devices, the pollution slurry was applied with the insulative tool rotating with its horizontal axis. ESDD measurements were obtained from two 30 cm sections of the 1 m portion of the insulative tool without safety devices and from two groups of 5 safety devices each. The target ESDD level was the same condition as had resulted in a withstand for the tests at 320 kV on insulative tools without the safety devices. A total of 5 constant voltage tests were made without flashover at voltages greater than 320 kV using the same fog rate as previously. The results are summarized in Table II:

TABLE II

Clean Fog Withstands - Insulative Tools with Safety Devices

| | | | ESDD μg/cm$^2$ | | | |
|---|---|---|---|---|---|---|
| | | | Insulative Tool | | 5 Safety Devices | |
| Test | kV | Minutes to Flashover | Upper Sect. | Lower Sect. | Upper group | Lower group |
| B3-1 | 380 | 63 | 1.7 | 1.6 | 1.9 | 2.0 |
| B3-2 | 400 | 54 | 1.8 | 1.7 | 1.9 | 1.7 |
| B3-3 | 420 | 58 | 1.9 | 1.8 | 2.2 | 2.2 |
| B3-4 | 420 | 68 | 1.9 | 1.8 | 2.2 | 2.2 |
| B3-5 | 420 | 65 | 1.9 | 1.8 | 2.2 | 2.2 |

The clean fog tests on the insulative tools with safety devices did not exceed 420 kV due to the limitations of the test supply.

As evidence by the results, the insulative tools tested without the safety devices were readily susceptible to electrical flashover at 320 kV at circa 70 minutes following the time of the initiation of >2 mA leakage current, whilst the insulative tools fitted with the safety devices were not susceptible to electrical flashover at 320 kV under the same conditions and electrical flashovers only occurred when significantly high voltages were applied. In essence, insulative tools fitted with the safety devices exhibited significantly higher withstand voltages, based on similar times and ESDD values, than insulative tools without any safety devices. As the nomenclature implies, withstand voltage means the voltage which the insulative tool material will withstand before electrical flashover or arching.

Figure 6A:
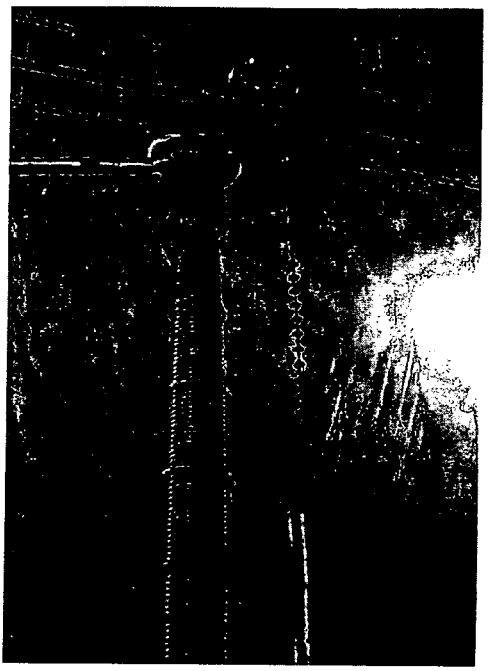
FIG. 6a is a photographic view of the clean fog test setup illustrating a vertically positioned insulative tool fitted with 15 safety devices equally spaced over the lower 2 m of the insulative tool with the upper universal fitting of the insulative tool being in contact with a lower subconductor of a 4-conductor bundle and the lower universal fitting of the insulative tool being connected to ground by means of a coaxial cable to a shunt at the floor of the test chamber.
Figure 6B:
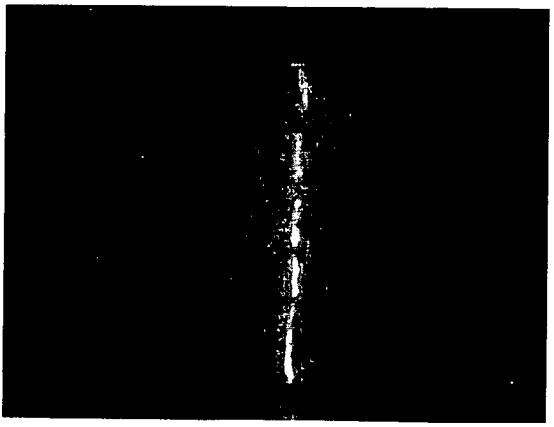
FIG. 6b is a photographic view of a vertically positioned insulative tool not fitted with any safety device of the present invention in a clean fog test.
Figure 6C:
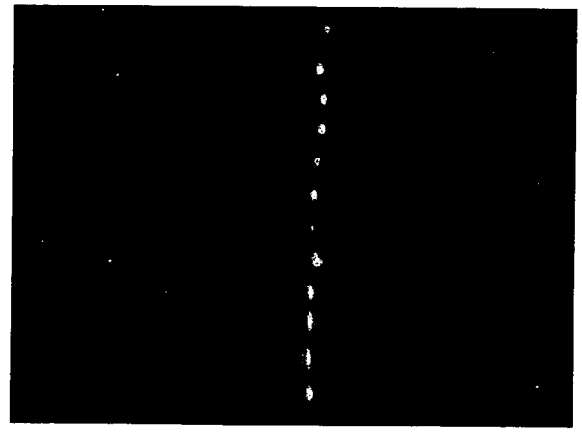
FIG. 6c is a photographic view of a vertically positioned insulative tool fitted with safety devices of the present invention in a clean fog test.

In order to monitor the U.V. activity during the clean fog tests, a Forsyth corona camera was used capture images of the insulative tools during testing and under conditions as described above. FIG. 6A shows an insulative tool equipped with the safety devices prior to a clean fog test. FIG. 6A illustrates the distinct presence of electrical streamers along the insulative tool without any safety devices shortly prior to electrical flashover. Conversely, in FIG. 6B, the positioning of the safety devices onto the insulative tool effectively limited the presence and travel of surface electrical streamers along the insulative tool.

EXAMPLE 2

Non-Uniform Rain Testing of Insulative Pole with and without Safety Devices of the Present Invention The tests in non-uniform rain having a conductivity of 100 µS/cm were made on 3.0 m vertical insulative tools with the same electrode configuration as for the clean fog tests. The upper 80 cm of the insulative tool remained dry during the test. From 80 cm to 190 cm the rain rate was 1.5 mm/minute and from 190 cm to 300 cm the rain rate was 1.0 mm/minute. The rain rate was equal in the vertical and horizontal planes. The rain was started 15 minutes before the application of voltage. 220 kV was applied instantaneously and the voltage then ramped up at a rate of 10 kV/second until flashover occurred. A second flashover test was made on each insulative tool immediately after the rain was stopped. The results of tests on 10 insulative tools without safety devices and on 11 insulative tools with safety devices are shown in Table III:

TABLE III

Non-uniform Rain Tests

| Tools without Devices | | Tools with Devices | |
|---|---|---|---|
| | Flashover kV | | Flashover kV |
| Test | In rain | After rain | Test | In rain | After rain |
| C2-1 | 530 | 789 | C3-1 | 899 | 828 |
| C2-2 | 546 | 881 | C3-2 | 953 | 844 |
| C2-3 | 603 | 913 | C3-3 | 807 | 822 |
| C2-4 | 495 | 617 | C3-4 | 739 | 763 |
| C2-5 | 778 | 883 | C3-5 | 829 | 686 |
| C2-6 | 772 | 832 | C3-6 | 839 | 835 |
| C2-7 | 715 | 840 | C3-7 | 944 | 848 |
| C2-8 | 624 | 645 | C3-8 | 945 | 933 |
| C2-9 | 405* | 439* | C3-9 | >950 | 945 |
| C2-10 | 672 | 888 | C3-10 | 855 | 819 |
| | | | C3-11 | 958 | 890 |

*Insulative tool with mat surface finish

Using the data from Table III, an analysis of the non-uniform rain flashover data will be found in Table IV for insulative tools without devices and in Table V for insulative tools with safety devices.

TABLE V

Insulative Tools Without Safety Devices in Non Uniform Rain

| Condition | $U_{50}$ kV | σ % | $U_W$ kV |
|---|---|---|---|
| Under rain | 614 | 20 | 340 |
| After rain | 773 | 20 | 428 |

TABLE VI

Insulative Tools With Safety Devices in Non Uniform Rain

| Condition | $U_{50}$ kV | σ % | $U_W$ kV |
|---|---|---|---|
| Under rain | 614 | 20 | 340 |
| After rain | 773 | 20 | 428 |

In the analysis, $U_W = U_{50} - 2.23\sigma$. Note that $-2.23\sigma$ (or 1.29% probability) describes the risk of flashover experienced in the field for this work method. Again as illustrated by the results, the insulative tools fitted with the safety devices of the present invention were significantly more resistant to electrical flashover than those without any safety devices in terms of both $U_{50}$ and $U_W$ measurements. The improvement in the withstand voltage, $U_W$ through the use of the safety devices of the present invention was 112% in rain and 58% after the rain had been stopped.

Figure 7A:
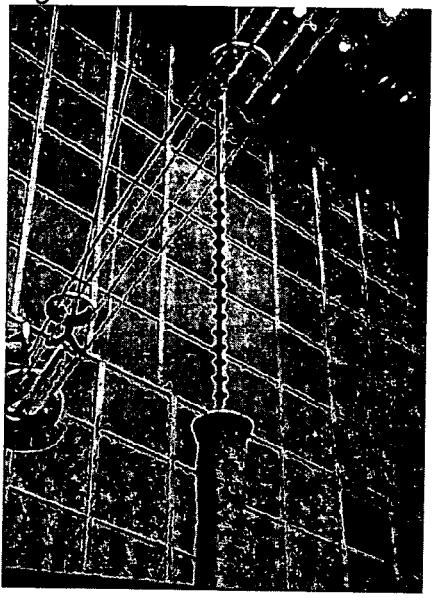
FIG. 7a is a photographic view of the non-uniform rain test setup illustrating a vertically positioned insulative tool fitted with 15 safety devices of the present invention equally spaced over the lower 2 m of the insulative tool with the upper universal fitting of the insulative tool being in contact with a lower subconductor of a 4-conductor bundle and the lower universal fitting of the insulative tool being connected to ground by means of a coaxial cable to a shunt at the floor of the chamber.
Figure 7B:
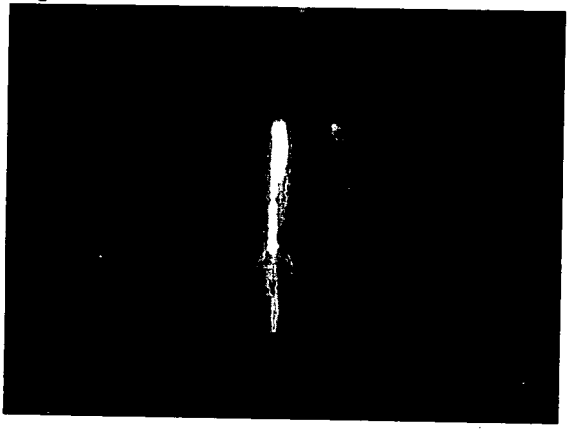
FIG. 7b is a photographic view of a vertically positioned insulative tool not fitted with any safety device of the present invention in a non-uniform rain test.
Figure 7C:
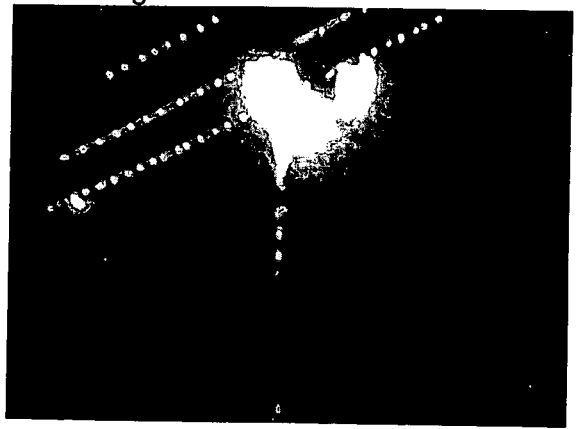
FIG. 7c is a photographic view of a vertically positioned insulative tool fitted with safety devices of the present invention in a non-uniform rain test.

Examples of the U.V. activity during the non-uniform rain tests are illustrated in FIG. 7B (no safety devices) and FIG. 7C (with safety devices). FIG. 7A shows an insulative tool equipped with safety devices of the present invention prior to a non-uniform rain test, and again, a Forsyth corona camera was used capture electrical flashover images in relation to the insulative tools during testing and under conditions as described above. With reference to FIG. 7b, it is clearly demonstrated that electrical flashover transcended along the length of the insulative tool, whilst in 7c, the safety devices significantly limited the travel of surface streamers along the insulative tool. In essence, the addition of the 15 safety devices to a 3.0 m FRP insulative tool essentially increases the theoretically leakage distance of the insulative tool by 0.9 m and significantly reduces the probability of flashover.

Having illustrated and described the principles of the invention in preferred embodiments, it should be appreciated to those skilled in the art that the invention can be modified in arrangement and detail without departure from such principles. All modifications coming within the scope of the following claims are to be claimed.

All publications, patents and patent applications referred to herein are incorporated by reference in their entirety to the same extent as if each individual publication, patent or patent application was specifically and individually indicated to be incorporated by reference in its entirety.

The embodiments of the invention in which an exclusive property or privilege is claimed are defined as follows:

1. A safety device in combination with an elongated insulative tool of a certain length extending between a user end arranged to be contacted by a worker and a working end arranged for operation near energized equipment and having a substantially circular cross section defining a cross sectional diameter and an outer circumference, the device being arranged to substantially modify an electrical field along a length of the insulative tool such that a field strength at the user end of the insulative tool is reduced and the device comprising:
   a body defining an inner opening receiving the insulative tool therethrough;
   the body spanning generally radially outwardly from the inner opening to lie transversely to a longitudinal direction of the insulative tool received therethrough;
   the body consisting of a material which is either semi-conductive or conductive;
   the body having an outer circumference which is between two times and five times greater in magnitude than the outer circumference of the elongated insulative tool; and the body being positioned nearer to the user end of the insulative tool than the working end of the insulative tool.

2. A safety device according to claim 1 wherein the inner opening is substantially circular having a bore diameter that is substantially the same as the cross sectional diameter of the elongated insulative tool.

3. A safety device according to claim 2 wherein the material of the body is a semi-conductive material.

4. A safety device according to claim 3 wherein the semi-conductive material comprises at least one element selected from a group consisting of elements from Group 2 (II), Group 13 (III), Group 14 (IV), Group 15 (V) and Group 16 (VI) of the chemistry periodic table.

5. A safety device according to claim 1 wherein the an inner opening is substantially circular having a bore diameter of between approximately 150 percent and approximately 450 percent of the cross sectional diameter of the elongated insulative tool.

6. A safety device according to claim 5 wherein the material of the body is a conductive material.

7. A safety device according to claim 1 wherein the safety device has at least one substantially circular rim disposed substantially concentrically on one or both substantially circular faces of the body.

8. A safety device according to claim 1 in combination with an elongated insulative tool received therethrough having a plurality of the safety devices supported at spaced positions therealong.

9. A device according to claim 1 wherein the body of the device is connected to ground.

10. A device according to claim 1 wherein the tool is connected to ground.

11. A method of improving the safety of an elongated insulative tool having a length extending between a user end arranged to be contacted by a worker and a working end arranged for operation near energized equipment, the method comprising:
providing at least one safety device comprising a body defining an inner opening, the body spanning generally radially outwardly from the inner opening;
forming the body to have an outer circumference which is between two times and five times greater in magnitude than an outer circumference of the elongated insulative tool;
forming the body to consist of a material which is either semi-conductive or conductive; and
modifying the electric field along the insulative tool when the working end is operated near energized equipment by locating the safety device on the tool such that a field strength at the user end of the insulative tool is reduced by extending the insulative tool through the inner opening of said at least one safety device and orienting the body of the safety device to lie transversely to a longitudinal direction of the insulative tool received therethrough and positioning the body nearer to the user end than the working end of the elongated insulative tool.

12. A method according to claim 11 wherein the inner opening is substantially circular having a bore diameter of between approximately 150 percent and approximately 450 percent of the cross sectional diameter of the elongated insulative tool.

13. A method according to claim 12 wherein the material of the body is a conductive material.

14. A method according to claim 13 wherein the conductive material is a metal or an alloy.

15. A method according to claim 11 wherein the inner opening is substantially circular having a bore diameter that is substantially the same as the cross sectional diameter of the elongated insulative tool.

16. A method according to claim 15 wherein the material of the body is a semi-conductive material.

17. A method according to claim 16 wherein the semi-conductive material comprises at least one element selected from a group consisting of elements from Group 2 (II), Group 13 (III), Group 14 (IV), Group 15 (V) and Group 16 (VI) of the chemistry periodic table.

18. A method according to claim 11 wherein two or more safety devices are placed around the elongated insulative tool in a manner that each safety device has its cross sectional diameter positioned substantially perpendicular to the longitudinal direction of the elongated insulative tool.

19. A method according to claim 11 wherein two or more safety devices are placed in series with respect to each other around the tool, each safety device being positioned about a respective segment of the elongated insulative tool which is proximate to the user end of the insulative tool.

20. A method according to claim 19 wherein the two or more safety devices have inner openings with different bore diameters.

21. A method according to claim 20 wherein at least one of the two or more safety devices has an inner opening with a bore diameter substantially the same as the cross sectional diameter of the elongated insulative tool and at least one of the two or more safety devices has an inner opening with a bore diameter of between approximately 150 percent and approximately 450 percent of the cross sectional diameter of the elongated insulative tool.

22. A method according to claim 21 wherein the at least one safety device having an inner opening with a bore diameter substantially the same as the cross sectional diameter of the elongated insulative tool is made of a semi-conductive material.

23. A method according to claim 22 wherein the semi-conductive material comprises at least one element selected from a group consisting of elements from Group 2 (II), Group 13 (III), Group 14 (IV), Group 15 (V) and Group 16 (VI) of the chemistry periodic table.

24. A method according to claim 21 wherein the safety devices having an inner opening with a bore diameter larger than the cross sectional diameter of the elongated insulative tool is made of a conductive material.

25. A method according to claim 18 wherein the two or more safety devices placed in series around the elongated insulative tool have inner openings with sequentially equal or decreasing bore diameters towards the terminus of the elongated insulated tool contacting a worker.

26. A method according to claim 18 wherein the two or more safety devices are placed in series at a separation interval of approximately twenty percent to approximately two hundred percent of the diameter of the elongated insulative tool.

27. A method according to claim 11 including grounding the body of said at least one safety device.

28. A method according to claim 11 including grounding the insulative tool.

* * * * *